(12) United States Patent
Cink

(10) Patent No.: US 10,369,531 B2
(45) Date of Patent: Aug. 6, 2019

(54) AUTOMATED PESTICIDE MIXING AND DISPENSING SYSTEM AND METHOD OF USE

(71) Applicant: BASF SE, Ludwigshafen (DE)

(72) Inventor: James H. Cink, Ballwin, MO (US)

(73) Assignee: BASF SE, Ludwigshafen (DE)

( * ) Notice: Subject to any disclaimer, the term of this patent is extended or adjusted under 35 U.S.C. 154(b) by 719 days.

(21) Appl. No.: 14/775,400

(22) PCT Filed: Mar. 13, 2014

(86) PCT No.: PCT/US2014/026345
§ 371 (c)(1),
(2) Date: Sep. 11, 2015

(87) PCT Pub. No.: WO2014/151732
PCT Pub. Date: Sep. 25, 2014

(65) Prior Publication Data
US 2016/0016128 A1    Jan. 21, 2016

Related U.S. Application Data

(60) Provisional application No. 61/786,769, filed on Mar. 15, 2013.

(51) Int. Cl.
*B01F 1/00* (2006.01)
*B01F 5/00* (2006.01)
(Continued)

(52) U.S. Cl.
CPC ......... *B01F 1/0038* (2013.01); *A01M 1/2038* (2013.01); *B01F 1/0022* (2013.01);
(Continued)

(58) Field of Classification Search
CPC ... A01M 1/2038; B01F 1/0038; B01F 1/0022; B01F 5/0057; B01F 15/00064; B01F 15/0207; B01F 2215/0009; B05B 9/0805
See application file for complete search history.

(56) References Cited

U.S. PATENT DOCUMENTS 3,976,087 A    8/1976    Bolton et al.
4,254,805 A    3/1981    Reeder
(Continued)

FOREIGN PATENT DOCUMENTS

CA    2010010 A    8/1990
EP    0385926 A1    9/1990
(Continued)

OTHER PUBLICATIONS

International Search Report and Written Opinion for PCT/US2014/026345, dated Jul. 23, 2014. 12 pages.

*Primary Examiner* — Anshu Bhatia
(74) *Attorney, Agent, or Firm* — Armstrong Teasdale LLP

(57) ABSTRACT

A system and method for mixing and dispensing one or more pesticides includes a plurality of pesticide containers (5) for containing pesticide and at least one dosing device (7) associated with the pesticides containers and adapted to dose pesticide from the pesticide containers. A mixing device (9) receives pesticide from the dosing device and mixes the pesticide to form at least one of a pesticide solution and a pesticide mixture. A computer device (21) includes a processor and is adapted to receive an input from a user and based on that input operate the dosing device to dose a quantity of pesticide from one or more of the pesticide containers.

26 Claims, 11 Drawing Sheets

(51) Int. Cl.
*B01F 15/02* (2006.01)
*A01M 1/20* (2006.01)
*B01F 15/00* (2006.01)
*B05B 9/08* (2006.01)

(52) U.S. Cl.
CPC ...... *B01F 5/0057* (2013.01); *B01F 15/00064* (2013.01); *B01F 15/0207* (2013.01); *B01F 2215/0009* (2013.01); *B05B 9/0805* (2013.01)

(56) References Cited

U.S. PATENT DOCUMENTS

| | | | |
|---|---|---|---|
| 5,150,840 A | 9/1992 | Grynkiewicz | |
| 5,184,420 A * | 2/1993 | Papadopoulos | A01G 31/00 47/62 N |
| 5,224,601 A * | 7/1993 | Gouge | A01N 25/04 206/524.7 |
| 5,660,330 A * | 8/1997 | Scott | A01M 1/06 239/305 |
| 6,003,787 A * | 12/1999 | Fisher | A01M 7/0017 239/355 |
| 6,947,810 B2 * | 9/2005 | Skinner | A01G 17/02 239/398 |
| 2005/0004714 A1 * | 1/2005 | Chen | A01M 1/2038 700/283 |
| 2006/0027676 A1 | 2/2006 | Buck et al. | |
| 2012/0072035 A1 * | 3/2012 | Nielsen | B05B 12/004 700/283 |

FOREIGN PATENT DOCUMENTS

| | | |
|---|---|---|
| JP | S5978103 A | 5/1984 |
| JP | S60061504 A | 4/1985 |
| WO | 89/11219 A2 | 11/1989 |

\* cited by examiner

AUTOMATED PESTICIDE MIXING AND DISPENSING SYSTEM AND METHOD OF USE

FIELD

The field of the invention relates generally to systems for mixing and dispensing pesticides and more specifically to automated pesticide mixing and dispensing systems and methods of using the systems.

BACKGROUND

Many pesticide products used in non-crop applications (e.g., residential and commercial pest control) are available in various container types (e.g., cans, bottles, jars, buckets, tubes, bags, boxes) and in various forms (e.g., liquids, gels, dusts/powders, granulars, pellets, tablets, blocks, foams, aerosols). Users of these pesticide products, for example pest management professions (PMPs), often scoop, pour, squeeze or otherwise dispense a desired amount of the selected pesticide product from the container into an application device or into a transport container. Some pesticide products, such as pesticide concentrates, are mixed with a diluent, such as water, while other pesticide products are available ready-to-use (RTU).

With respect to the pesticide products that are mixed with a diluent, the selection of the proper pesticide product, the accurate dosing or measuring of the quantity of the pesticide product and/or diluent, and the mixing of the pesticide product and the diluent can result a pesticide solution that is not well suited for a particular application. For example, the user of the pesticide product may select a pesticide product that is inferior to other available products for the job. In addition, even relatively minor discrepancies or errors in the measuring of the pesticide product and/or the diluent can result in pesticide solutions being too strong (i.e., too much pesticide concentrate to diluent) or too week (i.e., too little pesticide concentrate to diluent). A solution that is too strong, not only wastes pesticide product but can also present an exposure hazard. On the other hand, a solution that is too weak can lead to applications that fail to provide the protection or level of control that the pesticide product was intended to provide. Moreover, transferring of the pesticide solution (e.g., from the transport container to the application device) can potentially result in accidental exposure to the user(s) and/or spillage.

Furthermore, discrepancies or errors in the measuring of the pesticide product and/or the diluent often times correspond to errors in record keeping (e.g., tracking pesticide product inventory). Moreover, often due to work schedules and time constraints application records are not completed until after the application is completed or even later in the day or week when the user has time to complete the needed reports. These delays can also result in errors in record keeping.

As a result, systems and methods for more precisely and accurately dosing and mixing a pesticide concentration with a diluent are needed. In addition, there is a need for systems and methods that facilitate better record keeping and tracking of the pesticide products used during an application and where they were applied. Furthermore, there is a need for systems and methods that reduce potential exposure to the user during the dosing and mixing of pesticide solutions.

BRIEF DESCRIPTION

In one aspect, a system for mixing and dispensing one or more pesticides generally comprises a plurality of pesticide containers for containing pesticide and at least one dosing device. The at least one dosing device is associated with the pesticides containers and adapted to dose pesticide from the pesticide containers. A mixing device receives pesticide from the dosing device and mixes the pesticide to form at least one of a pesticide solution and a pesticide mixture. A computer device includes a processor and is adapted to receive an input from a user and based on that input operate the dosing device to dose a quantity of pesticide from one or more of the pesticide containers.

In another aspect, a system for dispensing one or more pesticides generally comprises a plurality of single-dose units containing a soluble pesticide and a diluent inlet for receiving a suitable diluent. Each of the single-dose units are selectively operably connectable to the diluent inlet for allowing a diluent from the diluent inlet to flow through the single-dose unit and at least in part dissolve the soluble pesticide. A computer device has a processor and is adapted to control a selective amount of diluent via the diluent inlet to flow through the single-dose unit.

In yet another aspect, a method of mixing and dispensing one or more pesticides generally comprises entering via an input component of a computer device having a processor a desired pesticide and a desired quantity to be dispensed. At least one dosing device associated with a pesticide container containing the desired pesticide is activated to dose a quantity of the desired pesticide to a mixing device. A quantity of diluent is directed to flow into the mixing device. The desired pesticide and diluent is mixed in the mixing device to form a pesticide solution. The pesticide solution is dispensed in the desired quantity to a container.

In still another aspect, a method of dispensing one or more pesticide generally comprises placing at least one single-dose unit containing a soluble pesticide in fluid communication with a diluent inlet, and directing a selected quantity of diluent to flow through the single-dose unit and dissolve the soluble pesticide contained therein to form a pesticide solution.

DETAILED DESCRIPTION OF THE DRAWINGS

Figure 1:
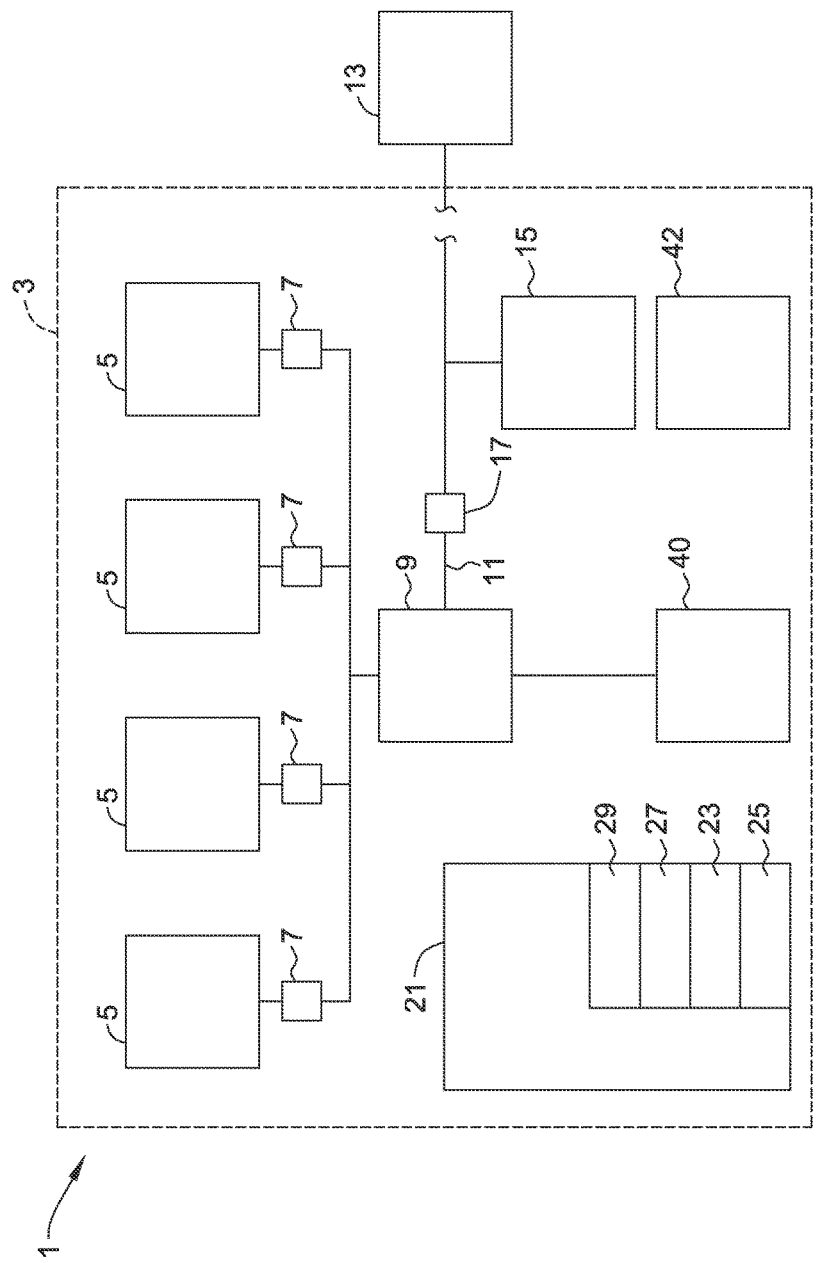
FIG. 1 is a schematic diagram of one suitable embodiment of a system for dispensing and mixing one or more pesticide.

FIG. 1 is a schematic diagram of one suitable embodiment of a system, indicated generally at 1, for mixing and dispensing one or more pesticide. More specifically, the embodiment of the system 1 illustrated in FIG. 1 is configured to mix and dispense one or more pesticide concentrate with a diluent to form a pesticide solution or mixture and to deliver the pesticide solution to a suitable container (e.g., a transportation container, an application container). In another embodiment, however, the system 1 can be configured to dispense and/or mix one or more ready-to-use (RTU) pesticides. It is contemplated that in some embodiments the system 1 can be adapted to dispense and mix both RTU pesticides and pesticide concentrates.

As used herein, the term "pesticide" refers to any substance or mixture for preventing, destroying, repelling, or mitigating any pest including insects, animals (e.g., mice, rats), plants (e.g., weeds), fungi, microorganisms (e.g., bacteria and viruses), pseudocoelomates (e.g., nematodes) and prions. The term "insecticide", which is a type of pesticide, is used herein to mean any substance or mixture for preventing, destroying, repelling, or mitigating insects. The term "termiticide", which is a type of insecticide, is used herein to mean any substance or mixture for preventing, destroying, repelling, or mitigating termites.

Exemplary commercially available pesticides include, but are not limited to, Alpine® WSG water soluble granule insecticide; Phantom® termiticide-insecticide; Prescription Treatment® brand 381B Advance® liquid ant bait; Prescription Treatment® brand CyhaloCap CS; Prescription Treatment® brand Cy-Kick® CS controlled release; Prescription Treatment® brand Durashield® CS controlled release premise insecticide; Prescription Treatment® brand Microcare® 3% CS controlled release pyrethrins; Prescription Treatment® brand Optashield® CS controlled release premise insecticide; Prescription Treatment® brand PermaCap CS controlled release permethrin; Prescription Treatment® brand Perma-Dust® pressurized boric acid dust; Prescription Treatment® brand Pyri-Shield® EC emulsifiable concentrate premise insecticide; Prescription Treatment® brand Pyrethr-It® Pyrethrum Insecticide Formula 2; Prescription Treatment® brand ULD® BP-100 contact insecticide Formula 1; Prescription Treatment® brand ULD® BP-300 contact insecticide Formula 1; Prescription Treatment® brand ULD® BP-50 contact insecticide Formula 1; Prescription Treatment® brand ULD® HydroPy-300 pyrethrin concentrate Formula 2; Termidor® SC Termiticide/Insecticide; Termidor® 80 WG Termiticide/Insecticide; and Termidor® H•E termiticide. Each of these pesticides is available from BASF Corporation, Pest Control Solutions of St. Louis, Mo., U.S.A.

As seen in FIG. 1, the illustrated system 1 includes a mixing and dispensing device 3 comprising a plurality of pesticide containers 5 for containing pesticides, a plurality of dosing devices 7, and a mixing device 9. The embodiment illustrated in FIG. 1 has four containers 5 but it is understood that the system 1 can have any suitable number of containers 5. In one suitable embodiment, each of the containers 5 contains a different type pesticide. The pesticides can be RTU, such as the pesticides listed above, or concentrate, such as one or more active ingredients of any of the RTU pesticides listed above. Moreover, the pesticides can be in any suitable form (i.e., liquids, gels, dusts/powders, granulars, pellets, tablets, blocks). In one embodiment, the pesticide containers 5 are affixed to the mixing and dispensing device 3. In such an embodiment, the pesticides can be transferred (e.g., poured) from the manufacturer supplied container to the pesticide container 5. In another suitable embodiment, the mixing and dispensing device 3 is configured to receive the manufacturer supplied container. In such an embodiment, the manufacturer supplied container defines the respective pesticide container 5.

Figure 2:
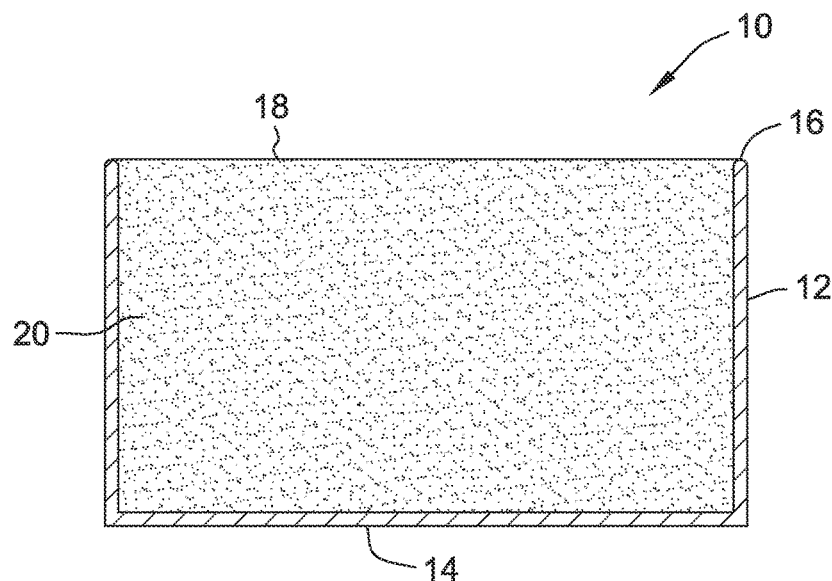
FIG. 2 is a cross-section of one suitable embodiment of a single-dose unit for use with the system of FIG. 1.
Figure 3:
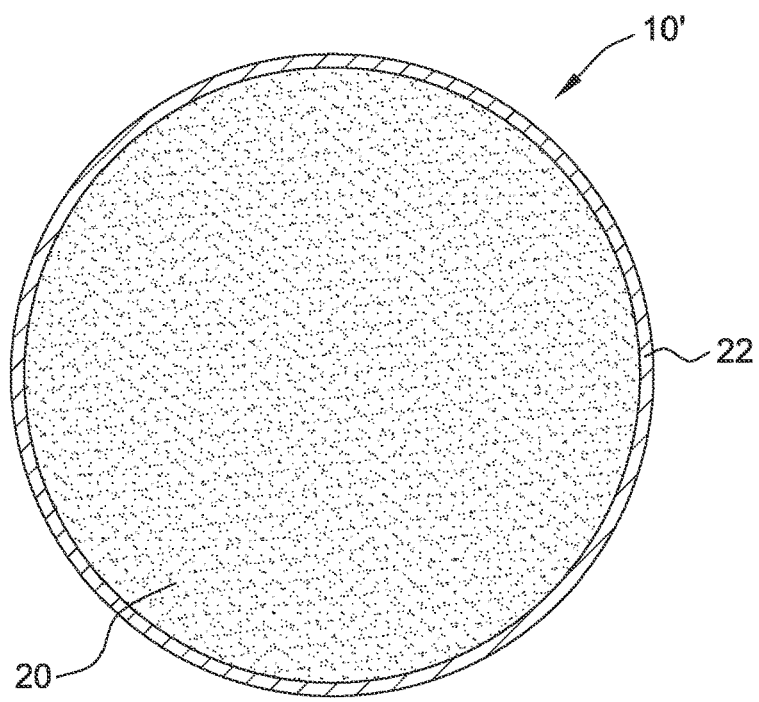
FIG. 3 is a cross-section of another suitable embodiment of a single-dose unit for use with the system of FIG. 1.

In yet another suitable embodiment, the pesticide containers 5 can be manufacturer supplied containers in the form of single-dose units. In such an embodiment, the dosing devices 7 can be omitted. One exemplary single-dose unit is illustrated in FIG. 2 and indicated generally at 10. The illustrated single-dose unit 10 includes a substantially cylindrical shape body 12 having a closed end 14 and an opened end 16. The opened end 16 is sealed with a suitable membrane 18 (e.g., a metal foil bonded to the body 12 adjacent the opened end). As seen in FIG. 2, the single-dose unit 10 contains a soluble granular, powder or particulate matter pesticide 20. Another exemplary single-dose unit, indicated generally at 10', is illustrated in FIG. 3. In this embodiment, the soluble pesticide 20 is contained within an envelope 22. In one suitable embodiment, the envelope 22 is liquid permeable for allowing the diluent to readily pass through the envelope, such as a mesh bag. In another suitable embodiment, the envelope 22 can be dissolvable such that the envelope ready dissolves when contacted by the diluent.

Figure 5:
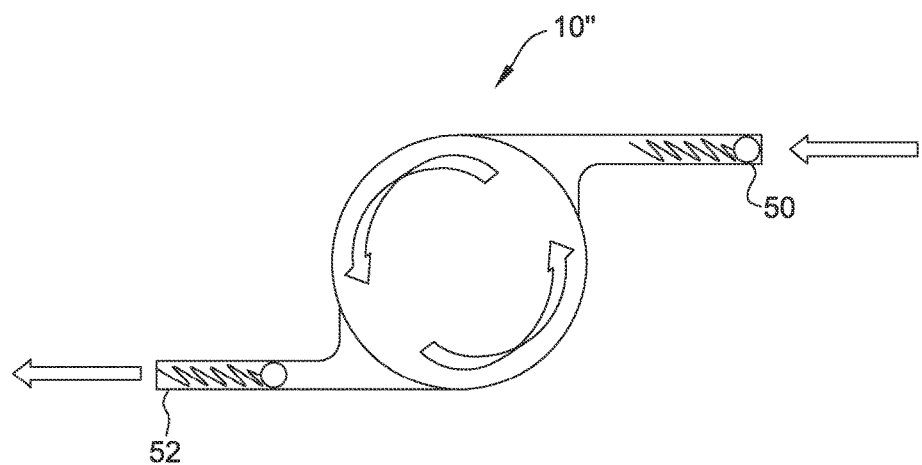
FIG. 5 illustrates one suitable embodiment of a single-dose unit for use with the system of FIG. 1.
Figure 6:
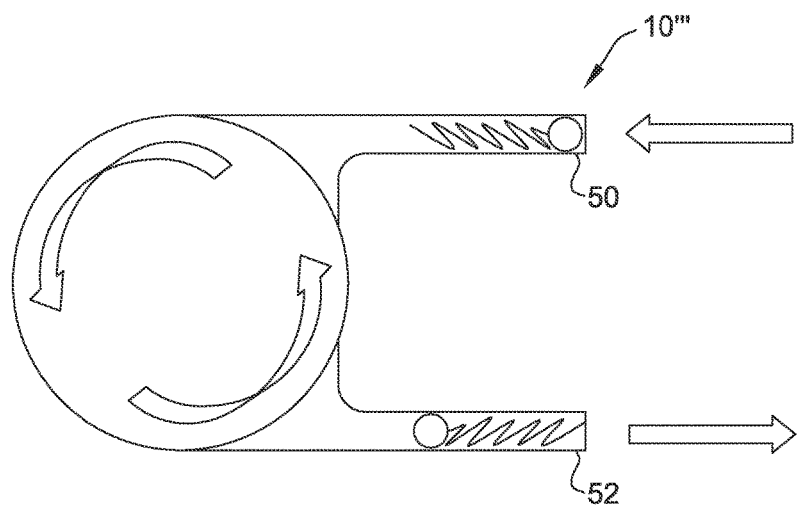
FIG. 6 illustrates one suitable embodiment of a single-dose unit for use with the system of FIG. 1.
Figure 7:
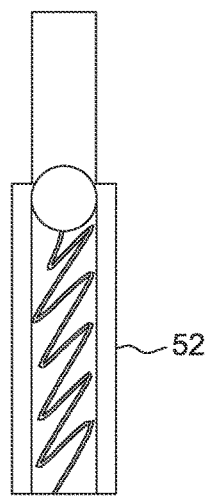
FIG. 7 is an enlarged view of inlet/outlet valves of FIGS. 5 and 6.

FIGS. 5 and 6 illustrated other suitable embodiment of a single-dose unit. The single-dose unit illustrated in FIG. 5 is indicated generally by reference number 10" and the single-dose unit illustrated in FIG. 6 is indicated generally by reference number 10'''. In each of these embodiments, diluent enters the unit 10", 10''' through an inlet valve 50. The pesticide within the unit 10", 10''' is solubilized by the diluent and then the resulting pesticide solution is flushed out of the unit via an outflow valve 52. The circular movement of the diluent within the unit 10", 10''' serves to mix the pesticide with the diluent and to assist in solubilizing the pesticide. The unit 10", 10''' can be selectively moved into a mixing position by attaching a suitable tube (not shown) to the unit 10", 10''' in a manner that prevents diluent from leaking at the connection. This can be accomplished by pressing the tube into the unit inflow valve 50 or by a suitable connection fitting. Any suitable valve system can be used on the inlet and outlet. FIG. 7 is an enlarged view of the inlet valves 52 of FIGS. 5 and 6, which are ball and spring operated valves.

Figure 8:
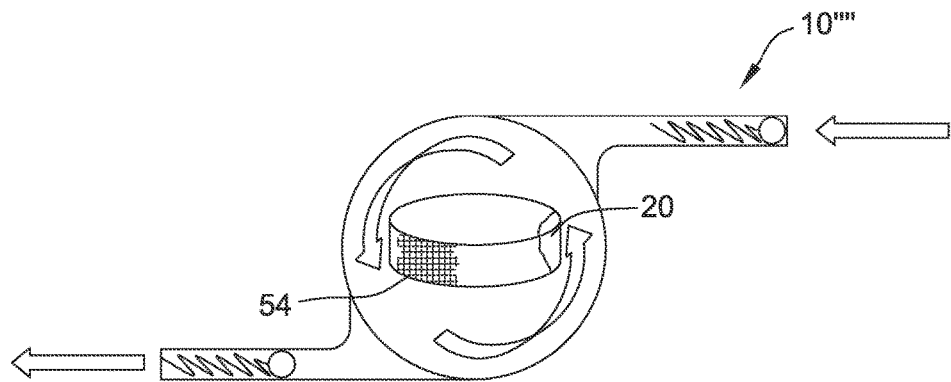
FIG. 8 illustrates one suitable embodiment of a single-dose unit for use with the system of FIG. 1.

FIG. 8 illustrates an embodiment of a single-dose unit, indicated generally at 10"" having pesticide concentrate 20 contained within a suitable envelope 54 (e.g., a mesh bag) within the unit. This embodiment of the unit 10"" is free of inlet and outlet valves. It is contemplated that the envelope can be made from a soluble material that dissolves with the pesticide concentrate and is flushed out of the unit with the pesticide solution.

With reference again to FIG. 1, each of the illustrated dosing devices 7 is in operable communication with one of the pesticide containers 5 and is adapted to deliver a pre-determined quantity (i.e., a dose) of pesticide to the mixing device 9. It is understood that the dosing devices 7 can be any suitable dosing device (e.g., an auger system, a reciprocating cup, a dosing pump, a micro-injector). As mentioned above, the dosing devices 7 can be omitted when using single-dose unite, such as the single dose units 10, 10' illustrated in FIGS. 2 and 3.

The illustrated embodiment of the mixing and dispensing device 3 includes a diluent inlet 11 for receiving a suitable diluent (e.g., water, acetone or other solvent) from an external source 13 (e.g., a standard residential water spigot, a liquid supply tank mounted in a van or truck). It is contemplated that the mixing and dispensing device 3 can include a diluent reservoir 15 in addition to or instead of the diluent inlet 11. In one suitable embodiment, a filter 17 is provided to remove impurities and particulate matter from the diluent supply.

In one suitable embodiment having single-dose units, such as the single dose units 10, 10' illustrated in FIGS. 2 and 3, the diluent can be directed to flow through the single-dose unit. In such an embodiment, a sufficient amount of diluent can be directed to flow through the single-dose unit to completely dissolve the pesticide 20 contained therein. It is contemplated that in such an embodiment, the mixing device 9 can be omitted. It is also contemplated that a sufficient amount of diluent can be directed to flow through the single-dose unit not only to completely dissolve the pesticide 20 contained therein but to also adequately rinse the single-dose unit so that the unit can be disposed of as common waste and not require special handling. For example, the amount of diluent can be sufficient to triple rinse the single-dose unit. In one suitable embodiment, the mixing and dispensing device 3 is further configured to air dry the single-dose unit after the unit is adequately rinsed.

The mixing device 9 of the device can be any suitable device configured to receive pesticide from the pesticide containers 5 and to sufficiently mix the pesticide to form a pesticide solution or mixture. In one suitable embodiment, the mixing device 9 is further configured to dispense the pesticide solution or mixture to a suitable container. As mentioned above, the mixing device 9 can be omitted from some embodiments of the device 3.

Referring still to FIG. 1, the system 1 further comprises a computing device 21, including a processor 23 for executing instructions. The processor 23 may include one or more processing units (e.g., in a multi-core configuration). In one suitable embodiment, the executable instructions are stored in a memory area 25 of the computing device 21. The memory area 25 can be any device for allowing information such as executable instructions and/or data to be stored and retrieved. The memory area 25 can include one or more computer readable storage device or other computer readable media, including transitory and non-transitory computer readable media.

The memory area 25 may include, but is not limited to, any computer-operated hardware suitable for storing and/or retrieving processor-executable instructions and/or data. The memory area 25 may include random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). Further, the memory area 25 may include multiple storage units such as hard disks or solid state disks in a redundant array of inexpensive disks (RAID) configuration. The memory area 25 may include a storage area network (SAN) and/or a network attached storage (NAS) system.

In some embodiments, the memory area 25 can include memory that is integrated in the computing device 21 and includes a database. For example, the computing device 21 can include one or more hard disk drives as the memory area 25. The memory area 25 may also include memory that is external to the computing device 21 and may be accessed by a plurality of computing devices. The above memory types are exemplary only, and are thus not limiting as to the types of memory usable for storage of processor-executable instructions and/or data.

The computing device 21 further includes an output component 27 for presenting information to a user. The output component 27 can be any suitable component capable of conveying information to the user. In one suitable embodiment, the output component 27 is a display device (e.g., a liquid crystal display (LCD), organic light emitting diode (OLED) display, cathode ray tube (CRT), or "electronic ink" display) and/or an audio output device (e.g., a speaker or headphones). The computing device 21 also includes an input component 29 for receiving input from the user. In one embodiment, the input component 29 may include, for example, a keyboard, a key pad, a pointing device, a mouse, a stylus, a touch sensitive panel (e.g., a touch pad or a touch screen), or an audio input device. It is understood that a single component, such as a touch screen, may function as both the output component 27 and the input component 29.

Figure 9:
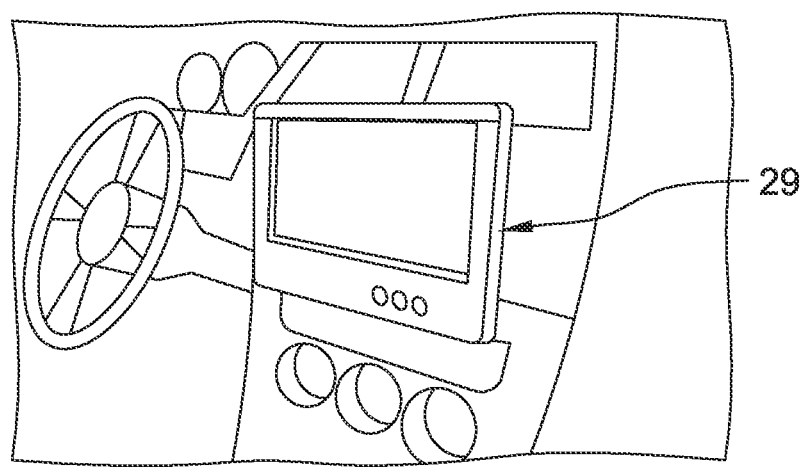
FIG. 9 illustrates an input component suitable for use with the system of FIG. 1.

In the embodiment illustrated in FIG. 1, the input component 29 is physically coupled to the computing device 21. It is contemplated that the computing device 21 including the input component 29 can be placed in close proximity to the outer components of the mixing and dispensing device 3 (e.g., the pesticide containers 5, the dosing devices 7, and the mixing device 9) or spaced therefrom. In one suitable embodiment wherein the system 1 is mounted on a vehicle, the computing device 21 and/or input component 29 can be mounted inside the passenger compartment of the vehicle (e.g., a cab of a truck). FIG. 9, for example, illustrates the input component 29 mounted in the cab of a truck.

Figure 4:
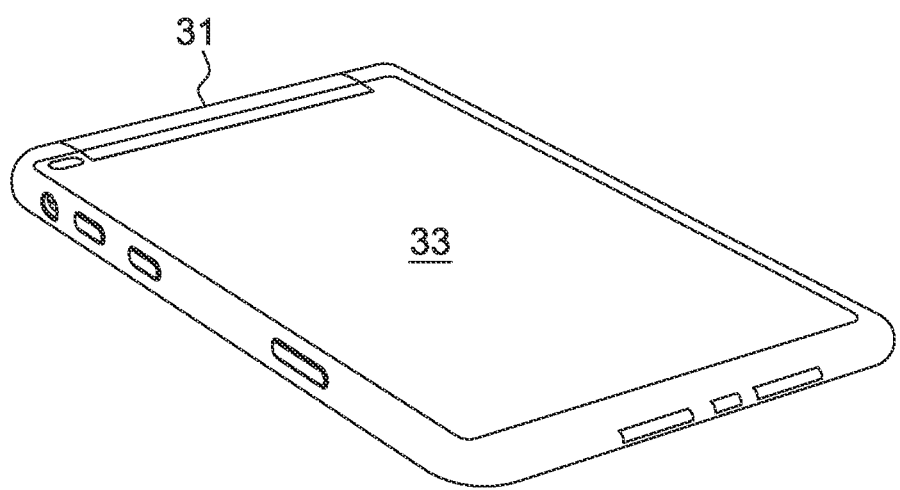
FIG. 4 is a perspective of a portable computer device for use with the system of FIG. 1.

In one suitable embodiment, which is illustrated in FIG. 4, the output component 27 and/or input component 29 can be a portable computer device 31 having a display 33 including, but not limited to, a laptop, a tablet, or a smartphone, using any operating system. In the illustrated embodiment, the portable computer device 31 is a tablet. The display 33 may be any suitable LED, LCD or other display screen. The illustrated display 33, for example, is a touchscreen display that allows the user to input data by physical contact with the display using a pointing device, for example by use of a finger or stylus. The illustrated portable computer device 31 includes a processor, internal memory and a communication port for electronic communication with the computing device 21. As used herein, "electronic communication" refers to any mode of electronic communication that provides the ability to transfer data between the portable computer device 31 and the computing device 21. In one embodiment, the portable computer device 31 and the computing device 21 are in electronic communication using wireless technologies such as a Wi-Fi network, Bluetooth®, infrared, radiofrequency or the like. In other embodiments, the portable computer device 31 and the computing device 21 can be in electronic communication via physical wires or cables or the like that directly couple the portable computer device 31 to the computing device 21.

In one embodiment, a method of using the system 1 of FIG. 1 comprises a user (e.g., a pest management professional (PMP)) entering via the input component 29 a desired pesticide and a desired quantity. The system 1 of FIG. 1 is configured to dose and mix the selected pesticide in the selected quantity and then dispense the resulting pesticide solution into a suitable container 40. In the illustrated embodiment, for example, the user can enter the desired pesticide and the desired quantity using the input component 29 directly coupled to the computing device 21 or can enter the information using the touch display 33 of the portable computer device 31.

It is understood that the desired pesticide and the desired quantity can be entered directly or indirectly. That is, the user can directly enter the specific pesticide (i.e., by brand name, by active ingredient) and quantity (e.g., milliliters, liters, gallons, grams, ounces, pounds) into the input component 29 or the portable computer device 31. The user can also enter the information indirectly by entering one or more criteria reflective of the desired pesticide solution. For example, the inputted criteria can include, but not limited to, one or more of the following: target pest or pests (e.g., mice, rats, squirrels, moles, opossums, raccoons, ants, cockroaches, beetles, earwigs, silverfish, crickets, spiders, centipedes, millipedes, scorpions, pillbugs, sowbugs, flies, mosquitoes, gnats, moths, wasps, hornets, bees, fleas, bed bugs, and the like); type of application and/or type of surface to be treated (e.g, crack and crevice treatment, broad treatment, spot treatment, soil injection, doors, windows, rugs, concrete); application site information (e.g., residential, school, restaurant, daycare, hospital, health care facility, industrial building, office building, state in which the site is located, kids, pets); and size of application (e.g., linear feet for crack and crevice; square feet for broad treatment). The computer device 21 can then determine based on the one or more criteria reflective of the desired pesticide solution the appropriate pesticide or pesticides and the appropriate quantity to dispense.

Once the appropriate pesticide(s) and quantity are determined by the computer device 21 or entered by the user, the computer device 21 activates the appropriate dosing device 7 or dosing devices, which causes pesticide to be transported into the mixing device 9. In the illustrated embodiment wherein the pesticide is a pesticide concentrate, a suitable diluent (e.g., water, acetone or other solvent) is driven into the mixing device 9 via the diluent inlet 11 wherein the diluent can be sufficiently mixed with the pesticide concentrate(s) to form a pesticide solution. It is understood that both water and a suitable solvent (e.g., acetone) can be used to form the pesticide solution. It is also understood that the diluent inlet 11 can be omitted in some embodiments, for example when the pesticides contained in the pesticide containers 5 are dusts/powders, granulars, pellets, tablets, blocks. In such an embodiment, the mixing device 9 can be configured to sufficiently mix the pesticides to form a pesticide mixture. The resulting pesticide solution or pesticide mixture can then dispensed by the mixing device 9 to the container 40.

In an embodiment wherein single-dose units are used (e.g., the single-dose units 10, 10' illustrated in FIGS. 2 and 3), the user can insert one or more single-dose units into the device 3. As mentioned above, in some embodiments of the device adapted to use single-dose units, the dosing devices 7 and/or the mixing device 9 can be omitted. In such an embodiment, the diluent inlet 11 is configured to drive diluent directly into the one or more single-dose units placed in the device 3. It is contemplated that the device 3 can be configured to hold one single-dose unit at a time or it can be configured to hold a plurality of single-dose units simultaneously.

In one method of use, the user can place one or more of the single-dose units containing the desired pesticide(s) into the device 3. The desired quantity of pesticide solution can be achieved by selecting the appropriate number of single-dose units to achieve the desired quantity in a single run or the device 3 can be ran multiple cycles to achieve the desired quantity. It is also contemplated that the single-dose units of pesticide can be provided in various sizes corresponding to various quantities of pesticide solution.

In another method of use, the user can also enter one or more criteria reflective of the desired pesticide solution and the computer device 21 can determine which single-dose unit(s) should be inserted into the device 3. For example, the inputted criteria can include, but not limited to, one or more of the following: target pest or pests (e.g., mice, rats, squirrels, moles, opossums, raccoons, ants, cockroaches, beetles, earwigs, silverfish, crickets, spiders, centipedes, millipedes, scorpions, pillbugs, sowbugs, flies, mosquitoes, gnats, moths, wasps, hornets, bees, fleas, bed bugs, and the like); type of application and/or type of surface to be treated (e.g., crack and crevice treatment, broad treatment, spot treatment, soil injection, doors, windows, rugs, concrete); application site information (e.g., residential, school, daycare, hospital, health care facility, restaurant, industrial building, office building, state in which the site is located, kids, pets); and size of application (e.g., linear feet for crack and crevice; square feet for broad treatment). The computer device 21 can then determine based on the one or more criteria reflective of the desired pesticide solution the appropriate single-dose unit or units.

Once the appropriate single-dose unit(s) is in the device 3, the device can be activated to direct diluent via the diluent inlet 11 to flow through the single-dose unit(s). A sufficient amount of diluent will be directed to flow through the single-dose unit(s) to completely dissolve the pesticide(s) contained therein. In one suitable embodiment, the amount of diluent will also be sufficient to adequately rinse the single-dose unit(s) so that the unit(s) can be disposed of as common waste and not require special handling. For example, the amount of diluent can be sufficient to triple rinse the single-dose unit(s). In one suitable embodiment, the device 3 is configured to air dry the single-dose unit(s) after the unit is adequately rinsed.

Thus, the container 40 can be filled with pesticide solution to the target volume set by the PMP or automatically determined by the computer device 21. It is contemplated that the container 40 can be any suitable receptacle adapted to receive pesticide solution or pesticide mixture. It is also contemplated that the resulting pesticide solution or mixture can be in any suitable form, e.g., liquids, gels, dusts/powders, granulars, pellets, tablets, blocks, foams, aerosols.

In one embodiment, the application container 40 can be pressurized and the solution applied in a similar manner to an aerosol product or that of a typical hand-pump applicator. In one such embodiment, the container 40 can be any suitable bag-in-can or bag-on-valve container system. In these types of systems, the pesticide solution can be contained within a bag placed inside a rigid canister such that the pesticide solution is separated from the canister by the bag. Thus, the pesticide does not contact the canister. As a result, the canister can be made out of any suitable material including, in some cases, materials not completely compatible with the pesticide solution. Moreover, the canister can be reused and does not necessarily require rinsing between uses. In use, the canister is pressured using a suitable pressurizing agent. The bag separates the pesticide concentrate from the pressurizing agent thereby maintaining the formulation integrity of the concentrate. After use, the bag can be cleaned (e.g., tripled rinsed) and disposed of without any special handling.

Figure 10:
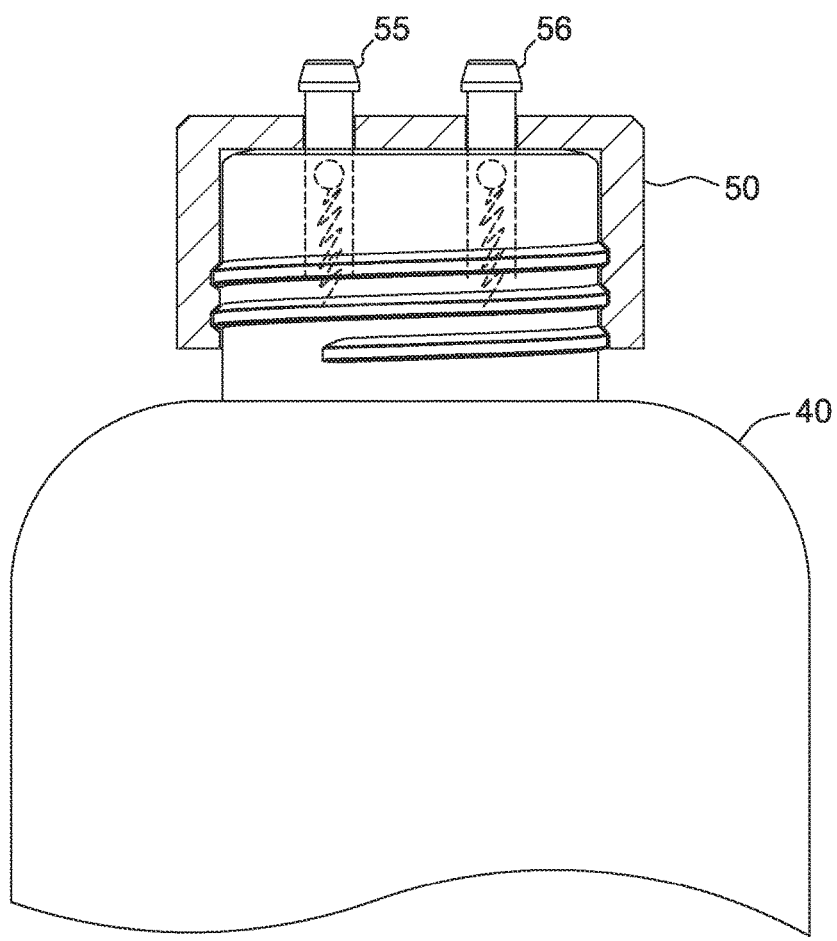
FIG. 10 illustrates one suitable embodiment of a container for use with the system of FIG. 1.

In the embodiment that does not require manual pumping to pressurize the application container 40, an adapter 50 can be affixed to the top of the container as illustrated in FIG. 10. The adapter 50 can include valves, orifices, and/or channels for allowing the pesticide solution to flow through the adapted and into the container 40 but not escape the container unless under pressure and a release valve activated. With the adaptor 50, the container 40 can be pressurized using a pressure generating device (e.g., an air compressor, compressed gas cylinder). In one suitable embodiment, the mixing and dispensing device 3 includes an air compressor 42 (FIG. 1). Once activated with pressurized gas, the container 40 can be attached to a commercially available application wand having the appropriate nozzle attachment for applying the desired spray pattern and volume output.

In another embodiment, the mixing and dispensing device 3 can adapted to dispense pesticide solution into a relatively large container or tank, such as those currently used by PMPs for power spraying around structures and yards. In such an embodiment, the container 40 can be a tank between about 5 gallons and about 50 gallons (e.g., a 15 gallon tank, a 25 gallon tank). In yet another embodiment, the container 40 can be a conventional hand-pump application container, such as a 1 quart or a 1 gallon hand sprayer. In still yet another embodiment, the container 40 can be a relatively small bottle or tube (e.g., 500 to 2,000 milliters). In one embodiment, the bottle is designed to withstand relatively high pressures and/or can be triple rinsed and disposed of through recycling or standard waste. In a suitable embodiment, the bottle can be fitted with a threaded cap to prevent pesticide solution or mixture from leaking from the bottle. In one embodiment, the cap of the bottle is adapted to allow pesticide solution to flow into the bottle from the mixing and dispensing device 3 but closes until a valve within the cap is moved to an opened position. In one such embodiment, the valve can only be moved to the opened position when the application container 40 is properly connected to an application wand or device.

Since the PMP does not handle any pesticides during the mixing and dispensing of the pesticide solution, the potential for the PMP to be exposed during the mixing and dispensing activities is minimized.

It is also contemplated that additional information can be inputted into the computer device 21 via the input component 29. It is also contemplated that the computer device 21 and/or the portable computer device 31 can be configured to automatically track, obtain and/or send data. For example, the computer device 21 and/or the portable computer device 31 can be configured to automatically track, obtain and/or send data information including, but not limited to, customer account records, site information (e.g., owner, address), application schedule (e.g., listing of pesticides used or to be used at the site and/or the dates applied or to be applied), GPS coordinates of the application site. The information can be stored on the computer device 21 and/or the portable computer device 31. In addition or instead of, the information can be transmitted (e.g., via a wireless system) to an external computer having a record keeping program. For example, application information can be transmitted to the PMP's place of business and downloaded into selected software programs that could then serve or aid in record retention, customer reporting (e.g., billing), as well as preparing reports for various state and/or federal agencies.

In one suitable embodiment, the output component 27 of the system 1 can comprise a printer. In such an embodiment, information relating to the application (i.e., type(s) of pesticide used, quantity of pesticide used, target pest(s), cost) can be printed and provided to the customer. In addition, the PMP can print a daily log or report that can be used by the PMP or turned into PMP's office.

In another embodiment, the output component 27 can comprise a communications device for sending communications to the external computer for allowing real time tracking and reporting of pesticide(s) and quantities used. The output component 27 could report on the amount of pesticide or number of single-dose units remaining in the system 1. This can aid the PMP in product inventory and tracking. In addition, the output component 27 can be configured to signal the PMP's office when and what pesticide(s) are needed in the system 1. This information can be used to verify the amount of product reported to be used for a specific application and the product that has been removed from the system.

Other suitable embodiments of systems for mixing and/or dispensing pesticides are illustrated in FIGS. 9-13.

In one embodiment, which is depicted in FIG. 10, the adapter 50 is provided for attachment to the container 40. In one suitable embodiment, the adapter 10 can be threadingly attached to the container 40. Other methods of secure attachment, not depicted in FIG. 10, such as clamping, or a bayonet-type fitting or mount are within the scope of the present disclosure. The adapter 50 may suitably be fitted with an air (or gas) port 55 and a water/solution port 56. The ports 55, 56 allow for inflow to the container 40 and prevent outflow therefrom. The air port 55 may comprise a mechanical release (not depicted) for allowing pressure to release from the container 40 during filling. In one aspect of the illustrated embodiment, for example, the user can fill the container 10 with a pesticide solution through the water/solution port 56 while venting through the air port 55 by way of a mechanical release. The mechanical release may then be closed and the container 40 may be pressurized through the air port 55 to a suitable operating pressure. Any suitable pressurizing gas, such as, for example, air or nitrogen, can be used. In another aspect of the illustrated embodiment, for example, the user can fill the container 10 with a pesticide solution without use of a mechanical release such that container 40 is at least partially pressurized while filling. The container 40 may then be pressurized through the air port 55 to a suitable higher operating pressure through the air port. In yet another aspect of the illustrated embodiment, the air port 55 is absent and filling and pressurization may be done entirely through the water/solution port 56. In any of the various aspects of this embodiment, pesticide solution application may suitably be done with a spray wand selectively attachable to the container 40.

Figure 11:
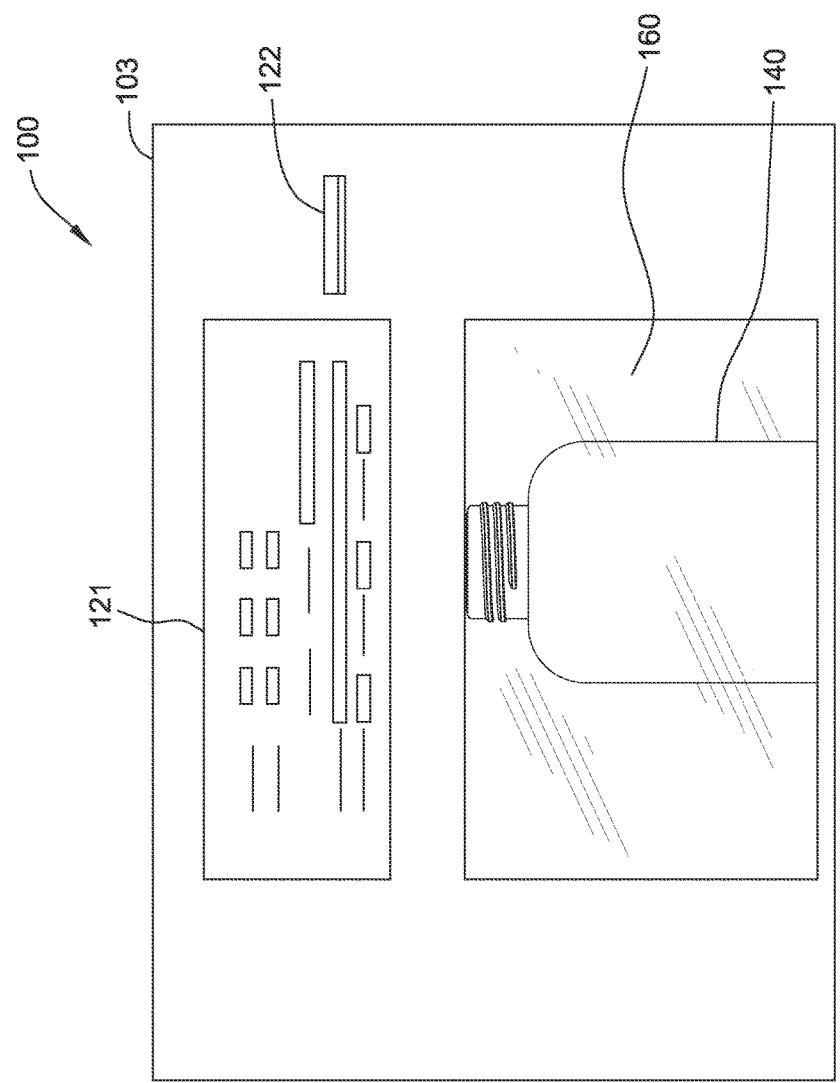
FIG. 11 illustrates one suitable embodiment of a system for dispensing pesticide into a container.

One exemplary integrated automatic system, indicated generally at 100, includes a mixing and dispensing device 103 is illustrated in FIG. 11. The device 103 includes a computer device 121, as described in detail elsewhere, for receiving an input from a user and dosing and mixing the selected pesticide in the selected quantity to a container 140. As described elsewhere, input may be by way of a touch screen or buttons, or an external device (not depicted). The pesticide mixing and dispensing device further includes a generally transparent shield 160, and an optional printer 122 integrated with the computer device 121. The computer device 121 may suitably be configured to automatically track, obtain and/or send data including, but not limited to, customer account records, site information (e.g., owner, address), application schedule (e.g., listing of pesticides used or to be used at the site and/or the dates applied or to be applied) and/or GPS coordinates of the application site. In some embodiments, the computer device 121 can be configured to generate real time data and/or historical reports of, for example, the identity of the product dispensed, the amount dispensed, location (e.g., GPS coordinates or address), or any other pertinent information that may be required for, for example, billing, product tracking, inventory, or regulatory reporting. Such reports may suitably be generated on request or on a daily, weekly, monthly or annual basis. Optionally, the printer 122 may be suitably used to generate product/application tickets at the location wherein the user may provide a copy to the customer and/or place a ticket in the customer file. In some embodiments, the user places the container 140 in the pesticide mixing and dispensing device 103 behind the shield 160 and couples pesticide solution and optional gas pressurizing lines (not depicted) to the container 140. The user enters product and mixing data into the computer device 121 and the container 140 is automatically filled. In some embodiments, container filling and pressurization are done simultaneously to reduce filling and pressurization cycle time.

Figure 12:
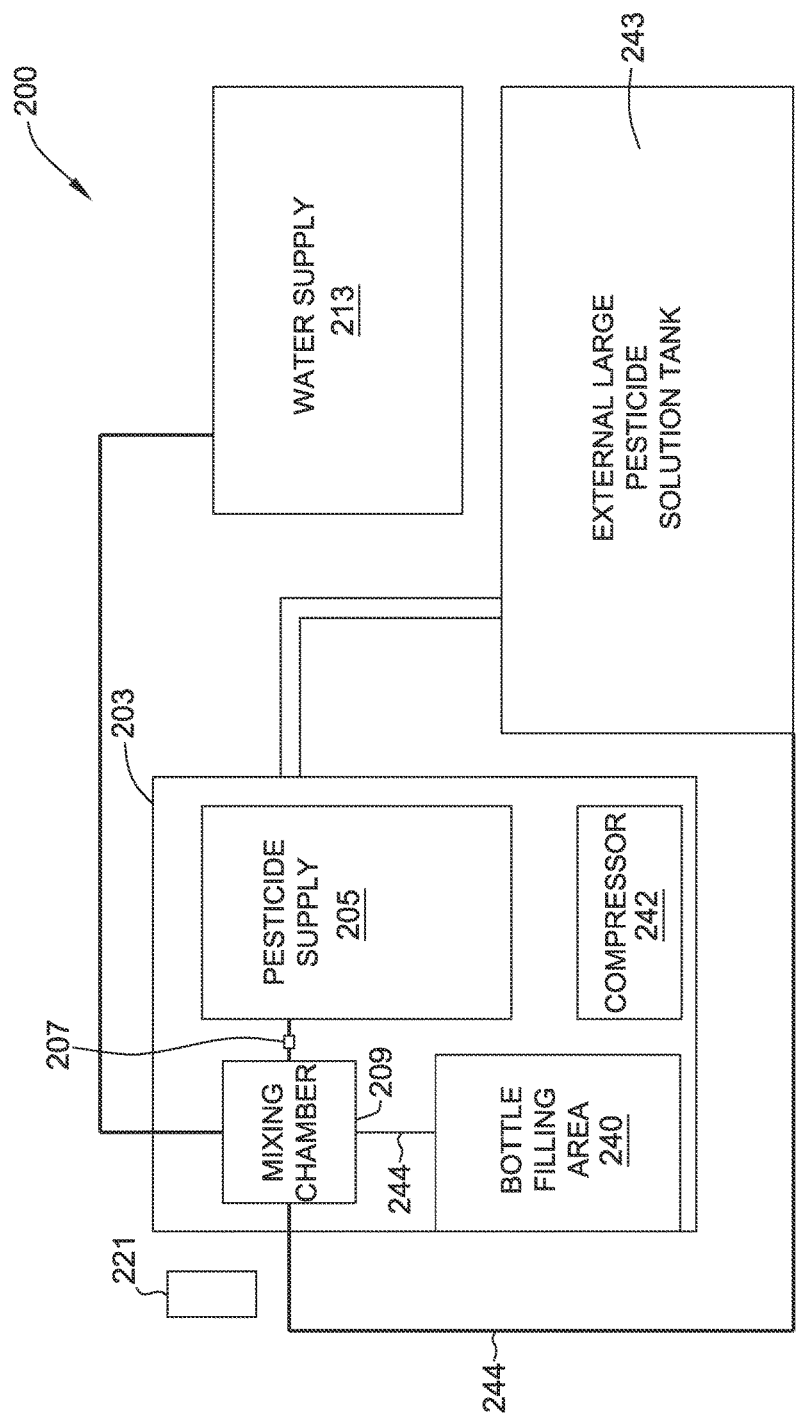
FIG. 12 illustrates one suitable embodiment of a system for dispensing pesticide into an external large pesticide solution tank or to a bottle filling area.

One exemplary embodiment for dispensing pesticide solutions into large external storage tanks is illustrated in FIG. 12 and indicated generally as system 200. The dispensing system includes a computer device 221, as described in detail elsewhere, for receiving an input from a user and dosing pesticide from pesticide supply 205 to a mixing chamber 209 where it is admixed with water from a water supply 213 to form pesticide solution 244 that is forwarded to external large pesticide solution tank 243 and/or to bottle (i.e., container) filling area 240. The supply 213 may instead be a source of any suitable non-aqueous diluent such as acetone, oil or other solvent. The external large pesticide solution tank 243 and/or one or more of the containers in bottle filling area 240 may be suitably pressurized with gas provided by a compressor 242. Depicted in FIG. 12 is a suitable dispensing device 207 that may suitably be (i) a check valve if the pesticide supply is a liquid in order to prevent back-flow from mixer 209 to pesticide supply 205, (ii) a pump, or (iii) an auger if the pesticide supply is a flowable solid. The pesticide supply 205, the dispensing device 207, the mixing chamber 209, the bottle filling area 240 and the compressor 242, collectively depicted as system 200, may suitably be located remotely from the external large pesticide solution tank 243 that may optionally be a dedicated storage tank, mounted in a van or truck, or placed on a flat bed. In some embodiments, the system 200 may be operated in a similar fashion as container filling system 100 depicted in FIG. 11. For instance, in some embodiments, the user connects the external storage tank 243 or containers in the bottle filing station 240 to a mixing chamber 209 outlet line and a compressor 242 line. The user enters product and mixing data into the computer device 221 and the tank 243 and/or the containers are automatically filled. In some embodiments, tank/container filling and pressurization are done simultaneously to reduce filling and pressurization cycle time.

Figure 13:
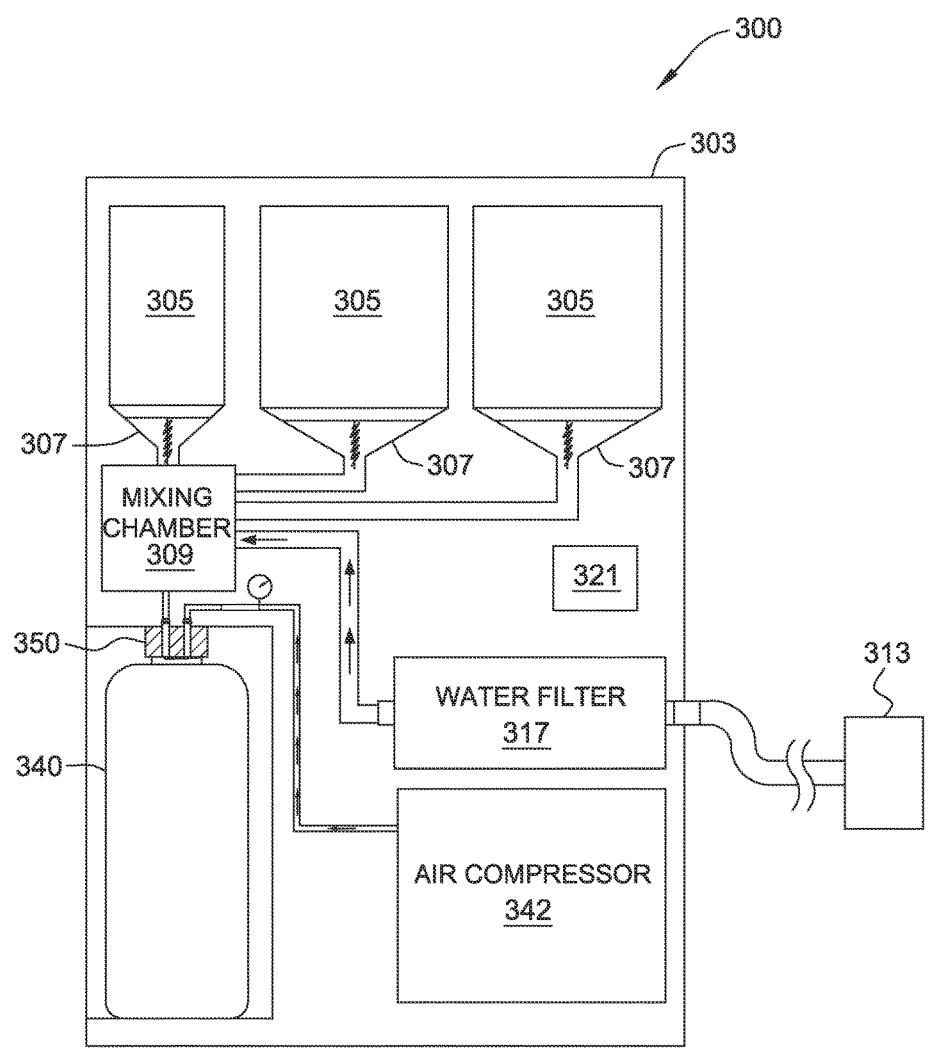
FIG. 13 illustrates one suitable embodiment of a system for system for dispensing pesticide into a container from one of a plurality of storage tanks.

One exemplary embodiment for mixing and dispensing pesticide solutions into containers from more than one optional source of pesticide is illustrated in FIG. 13 and indicated generally as system 300. The system includes a mixing and dispensing device 303 having multiple pesticide supply tanks 305, multiple dispensing devices 307 (e.g., augers), a mixing chamber 309, an adapter 350, a container 340, a water filter 317, an air compressor 342, and a computer device 321. Dilution water supply 313 may be located external as seen in FIG. 13 or internal to the system 300. Any of the pesticide storage tanks 305 may suitably contain a solid pesticide or a liquid pesticide. For solid pesticide storage, such a granules or powder, augers can suitable be used as the dispensing device 307. For liquid pesticide storage, the pesticide may be conveyed by any suitable method known to those skilled in the art such as by gravity, wherein the storage tank 305 is located at an elevation above the mixer 309, or by pumping (not depicted). Each of the tanks 305, the dispensing devices 307, the mixing chamber 309, the adapter 350, the container 340, the filter 317, the compressor 342 and the computer device 321 are described in detail elsewhere in and further in reference, for instance, to FIGS. 1, 5-8 (for pumping) and 10-12. In some embodiments, system 300 may be operated in a similar fashion as (i) the container 40 and the adapter 50 depicted in FIG. 10, (ii) container filling system 100 depicted in FIG. 11 and (iii) system 100 depicted in FIG. 11. For instance, in some embodiments, the user connects the adapter 350 to the container 340 wherein the adapter 350 is, in turn, connected to the mixing chamber 309 outlet and an air compressor 342. The user enters product and mixing data into the computer device 321 that automatically selects the storage tank 305 containing the requested pesticide source, initiates feeding of the pesticide and water from the dilution water supply 313 to the mixing chamber 309 at a ratio selected to achieve the desired pesticide concentration, and fills the container 340 to the required volume. In some embodiments, container filling and pressurization are done simultaneously to reduce filling and pressurization cycle time.

Figure 14:
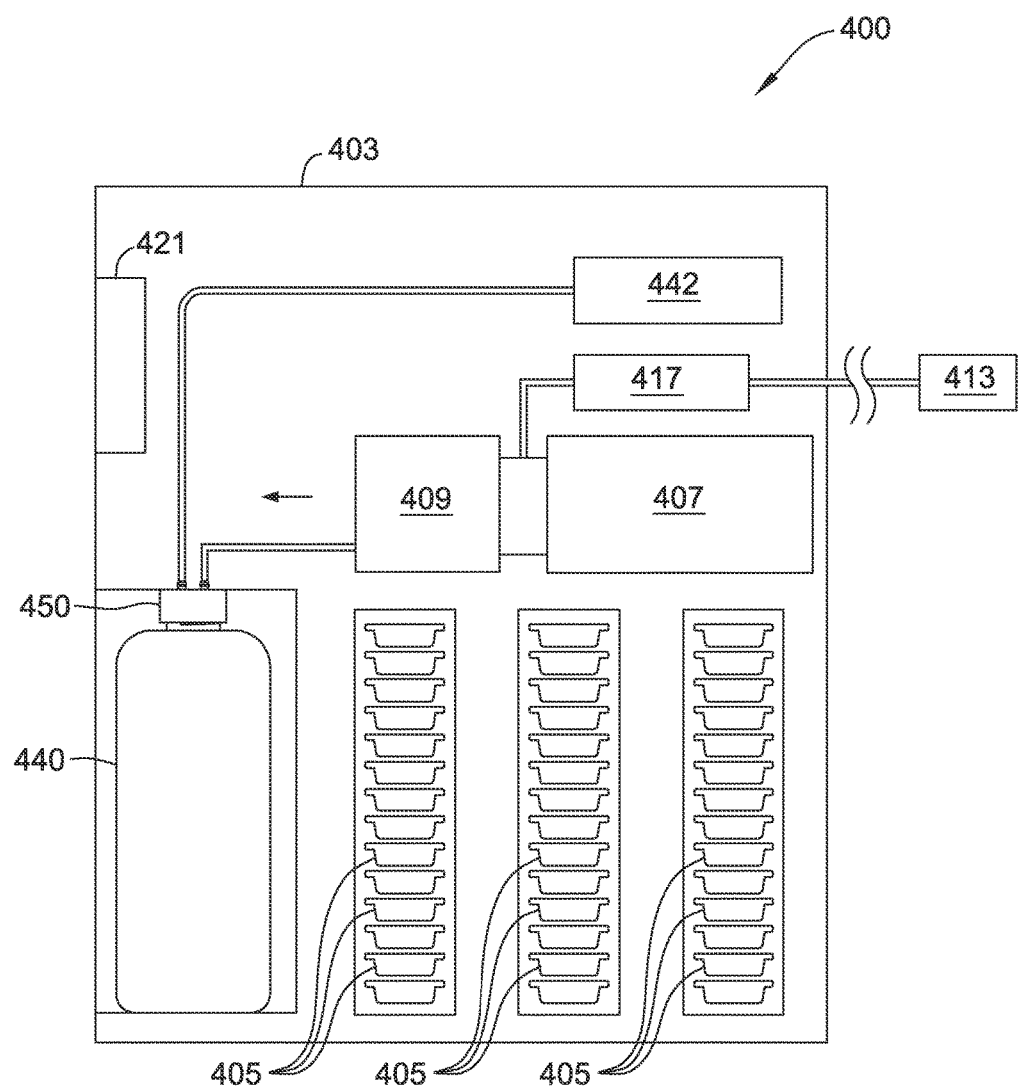
FIG. 14 illustrates one suitable embodiment of a system for dispensing pesticide into a container from one or more single-dose units.

One exemplary embodiment for mixing and dispensing pesticide solutions into containers from pesticide supplied in an enclosed pesticide container is illustrated in FIG. 14 and indicated generally at 400. The system includes a mixing and dispensing device 403 having pesticide supplied in an enclosed, single dose container 405, a dispensing device 407, a mixing chamber 409, a water filter 417, an air compressor 442, a computer device 421, an adapter 450, and a pesticide container 440. The dispensing device 407 selects the single-dose container 405 having pesticide concentrate therein, transfers it to the mixing chamber 409, and removes it from the mixing chamber 409 after removal of the pesticide therefrom. Suitable dispensing devices 407 capable of achieving the objects of this embodiment are known to those skilled in the packaging and food and beverage manufacturing arts. The dilution water supply 413 may be located external to the system 403 as illustrated in FIG. 14 or internally to the system 400. The container 405 may be any suitable container capable of holding pesticide solid or liquid, the amount of pesticide contained therein generally being of sufficient quantity to fill the pesticide container 440 upon dilution. In some embodiments, the container 405 is a cup or bowl formed from a material that may be punctured in at least two areas such that a flow of water through the container 405 may be established. In some embodiments, for example, the container 45 can be a formed thermoplastic container, such as a plastic cup or bowl, having a sealing top layer affixed thereto formed from plastic or foil sheet or film. In some other embodiments, the container 405 is a reusable container having an inlet fitting and an outlet fitting. The dispensing device 407 selects a pesticide container 405 from a supply area, and transfers and positions the container 405 in the mixing chamber 409. In some embodiments, the pesticide container 405 is punctured at an entry point and an exit point and a flow of the filtered dilution water is established through the container. In some embodiments, the dispensing device 407 inserts the water line through the container 405 top layer thereby puncturing it, and the mechanical unit separately punctures the bottom of the container 405. In some other embodiments, the dilution water 413 supply line and diluted pesticide line are each affixed to an adapter 450 fitting. In any of the various embodiments, pesticide contained in container 405 is dissolved or admixed with the dilution water and is passed to container 440 through adapter 450 as described elsewhere.

After completion of the mixing cycle, the empty pesticide container 405 is removed from the mixing chamber 409 by the dispensing device 407 thereby completing the cycle. The container 440 may be pressurized by gas supplied by air compressor 442 as described elsewhere. In some embodiments, the system 400 may be operated in a similar fashion as (i) the container 40 and the adapter 50 as depicted in FIG. 10, (ii) the container filling system 100 depicted in FIG. 11, (iii) the system 100 depicted in FIG. 11 or (iv) the system 303 depicted in FIG. 13. For instance, in some embodiments, the user connects the adapter 450 to the container 440 wherein the adapter 450 is, in turn, connected to the mixing chamber 409 outlet and the air compressor 442. The user enters product and mixing data into the computer device 421 that automatically engages the dispensing device 407 for acquisition and supply of the pesticide container 405 to the mixing chamber 409, initiates the feed of the dilution water 413 to mixing chamber 409 at a rate selected to essentially dissolve or remove the pesticide from the pesticide container 405, and fills container 440 to the required volume. In some embodiments, container 440 filling and pressurization are done simultaneously to reduce filling and pressurization cycle time.

It is contemplated that the entire system 1 or portions of the system can be mounted on a vehicle (e.g., a truck, a van, a ATV) or on a trailer. It is also contemplated that the system 1 or portions of the system can be portable (e.g., mounted on a moveable cart). It is further contemplated that the system 1 or portions of the system can be located remote from the application site (e.g., at the PMP's office). Placement of the system 1 at the PMP's office would typically provide a more secure location for the system compared to a mobile system. Moreover, the system at the PMP's office can be used to service numerous PMP's; reduce the need to train some or all the PMP's on its operation; and allows the pesticide concentration to be prepared in the appropriate quantity for a specific application site before the PMP leaves for the job sites.

While discussed above with respect to pesticides, it is contemplated that the systems, devices and methods described herein would be suitable in other industries. For example, the systems, devices, and method can be used for after-market mixing of two or more products in the pharmaceutical, industrial including industrial cleaning, machine shops and pet care industries. In one suitable use, the systems, devices, and methods described herein can be used with products that decay fairly quickly, that are not fully compatible with the container in which they are placed, or which otherwise require use shortly after they are mixed. The systems, devices, and methods described herein can be used to reduce or even eliminate the use of stabilizers in some products.

The above described devices, systems and methods incorporate a computer, or are computer controlled. The computer related embodiments described herein are not limited to any particular system controller or processor for performing the processing tasks described herein. The term controller or processor, as used herein, is intended to denote any machine capable of performing the calculations, or computations, necessary to perform the tasks described herein. The terms controller and processor also are intended to denote any machine capable of accepting a structured input and of processing the input in accordance with prescribed rules to produce an output. It should also be noted that the phrase "configured to" as used herein, with reference to a computer or processor, means that the processor is equipped with a combination of hardware and software for performing the tasks of embodiments of the invention, as will be understood by those skilled in the art. The term processor, as used herein, refers to central processing units, microprocessors, microcontrollers, reduced instruction set circuits (RISC), application specific integrated circuits (ASIC), logic circuits, and any other circuit or processor capable of executing the functions described herein.

The computer implemented embodiments described herein embrace one or more computer readable media (e.g., memory), including non-transitory computer readable storage media, wherein each medium may be configured to include or includes thereon data or computer executable instructions for manipulating data. The computer executable instructions include data structures, objects, programs, routines, or other program modules that may be accessed by a processing system, such as one associated with a general-purpose computer capable of performing various different functions or one associated with a special-purpose computer capable of performing a limited number of functions. Aspects of the disclosure transform a general-purpose computer into a special-purpose computing device when configured to execute the instructions described herein. Computer executable instructions cause the processing system to perform a particular function or group of functions and are examples of program code means for implementing steps for methods disclosed herein. Furthermore, a particular sequence of the executable instructions provides an example of corresponding acts that may be used to implement such steps. Examples of computer readable media include random-access memory ("RAM"), read-only memory ("ROM"), programmable read-only memory ("PROM"), erasable programmable read-only memory ("EPROM"), electrically erasable programmable read-only memory ("EEPROM"), compact disk read-only memory ("CD-ROM"), or any other device or component that is capable of providing data or executable instructions that may be accessed by a processing system.

A computer or computing device such as described herein has one or more processors or processing units, system memory, and some form of computer readable media. By way of example and not limitation, computer readable media comprise computer storage media and communication media. Computer storage media include volatile and non-volatile, removable and non-removable media implemented in any method or technology for storage of information such as computer readable instructions, data structures, program modules or other data. Communication media typically embody computer readable instructions, data structures, program modules, or other data in a modulated data signal such as a carrier wave or other transport mechanism and include any information delivery media. Combinations of any of the above are also included within the scope of computer readable media.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

When introducing elements of the present invention or the embodiment(s) thereof, the articles "a," "an," "the," and "said" are intended to mean that there are one or more of the elements. The terms "comprising," "including," and "having" are intended to be inclusive and mean that there may be additional elements other than the listed elements.

As various changes could be made in the above products and methods without departing from the scope of the invention, it is intended that all matter contained in the above description and shown in the accompanying drawings shall be interpreted as illustrative and not in a limiting sense.

What is claimed is:

1. A system for dispensing one or more pesticide, the system comprising:
   a plurality of single-dose units containing a soluble pesticide,
   a diluent inlet for receiving a suitable diluent, each single-dose unit of the plurality of single-dose units being selectively operably connectable to the diluent inlet for allowing a diluent from the diluent inlet to flow therethrough and at least in part dissolve the soluble pesticide contained therein, wherein each single-dose unit of the plurality of single-dose units comprises a container which is sealed prior to connection to the diluent inlet and is unsealed when connected to the diluent inlet to allow diluent to flow therethrough; and
   a computer device having a processor and being adapted to control a selective amount of diluent via the diluent inlet to flow through each single-dose unit of the plurality of single-dose units.

2. The system set forth in claim 1 wherein the computing device further comprises an input component for receiving input from the user.

3. The system set forth in claim 2 wherein the input component is one of a keyboard, a key pad, a pointing device, a mouse, a stylus, a touch sensitive panel and an audio input device.

4. The system set forth in claim 2 wherein the input component is physically coupled to the computing device.

5. The system set forth in claim 2 wherein the input component is a portable computer device having a display.

6. The system set forth in claim 5 wherein the portable computer is one of a laptop, a tablet, and a smartphone.

7. The system set forth in claim 1 wherein the pesticide is one of a granular pesticide, a particulate matter pesticide, and a powder pesticide.

8. The system set forth in claim 1 wherein each single-dose unit of the plurality of single-dose units comprises an envelope for containing the pesticide.

9. The system set forth in claim 8 wherein the envelope is liquid permeable for allowing a diluent to pass through the envelope and dissolve the soluble pesticide.

10. The system set forth in claim 8 wherein the envelope is water dissolvable.

11. The system set forth in claim 1 further comprising at least one outlet for channeling the diluent and the soluble pesticide out of each single-dose unit of the plurality of single-dose units.

12. The system set forth in claim 11 further comprising at least one container for receiving the diluent and the soluble pesticide from the outlet.

13. The system set forth in claim 1 further comprising at least one container for receiving the diluent and the soluble pesticide from each single-dose unit of the plurality of single-dose units.

14. The system set forth in claim 13 wherein the container is pressurized by at least one pressure generating device.

15. The system set forth in claim 14 wherein the pressure generating device comprises a compressed gas cylinder.

16. The system set forth in claim 14 wherein the pressure generating device comprises an air compressor.

17. The system set forth in claim 13 further comprising at least one adapter attached to the container for channeling the diluent and the soluble pesticide into the container.

18. The system set forth in claim 17 wherein the adapter comprises at least one member selected from the group consisting of a valve, an orifice, and a channel for channeling the diluent and the soluble pesticide into the container.

19. The system set forth in claim 13 further comprising an application wand attached to the container.

20. The system set forth in claim 19 wherein the application wand comprises a nozzle attachment attached to the container for applying the diluent and the soluble pesticide.

21. A method of dispensing one or more pesticide, the method comprising:
   placing at least one single-dose unit of a plurality of single dose units containing a soluble pesticide in fluid communication with a diluent inlet, each single dose unit of the plurality of single-dose units being selectively operably connectable to the diluent inlet;
   providing a computer device having a processor;
   directing a selected quantity of diluent to flow through at least one single-dose unit of the plurality of single dose units and at least partially dissolving the soluble pesticide contained therein to form a pesticide solution, wherein each single-dose unit of the plurality of single-dose units comprises a container which is sealed prior to connection to the diluent inlet and is unsealed when connected to the diluent inlet to allow diluent to flow therethrough; and
   controlling, with the computing device, the flow of the selected quantity of diluent through the at least one single-dose unit of the plurality of single dose units.

22. The method of claim 21 wherein the selected quantity of diluent directed through the at least one single-dose unit of the plurality of single-dose units is sufficient to triple rinse the at least one single-dose unit of the plurality of single-dose units.

23. The method of claim 22 further comprising air drying the at least one single-dose unit of the plurality of single dose units after the unit has been triple rinsed.

24. The method of claim 21 wherein directing a selected quantity of diluent to flow through the at least one single-dose unit of the plurality of single dose units comprises directing a selected quantity of water to flow through the at least one single-dose unit of the plurality of single dose units.

25. The method of claim 21 wherein directing a selected quantity of diluent to flow through the at least one single-dose unit of the plurality of single-dose units comprises directing a selected quantity of solvent to flow through the at least one single-dose unit of the plurality of single-dose units.

26. The method of claim 25 further comprising directing a selected quantity of water to flow through the at least one single-dose unit of the plurality of single dose units after the solvent has been directed through the at least one single-dose unit of the plurality of single dose units.

\* \* \* \* \*